(12) United States Patent
Guo et al.

(10) Patent No.: US 9,105,130 B2
(45) Date of Patent: Aug. 11, 2015

(54) VIEW SYNTHESIS METHOD CAPABLE OF DEPTH MISMATCHING CHECKING AND DEPTH ERROR COMPENSATION

(71) Applicant: National Chung Cheng University, Min-Hsiung, Chia-Yi (TW)

(72) Inventors: Jiun-In Guo, Minsyong Township, Chiayi County (TW); Kuan-Hung Chen, Dalin Township, Chiayi County (TW); Chih-Hao Chang, Douliu (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 201 days.

(21) Appl. No.: 13/760,982

(22) Filed: Feb. 6, 2013

(65) Prior Publication Data

US 2013/0201184 A1 Aug. 8, 2013

(30) Foreign Application Priority Data

Feb. 7, 2012 (TW) .............................. 101103920 A (51) Int. Cl.
*G06T 15/08* (2011.01)
*H04N 13/02* (2006.01)
*H04N 13/00* (2006.01)

(52) U.S. Cl.
CPC ............ *G06T 15/08* (2013.01); *H04N 13/0011* (2013.01); *H04N 13/026* (2013.01); *H04N 13/0271* (2013.01); *H04N 2013/0081* (2013.01)

(58) Field of Classification Search
None
See application file for complete search history.

(56) References Cited

U.S. PATENT DOCUMENTS

| 2009/0129667 | A1* | 5/2009 | Ho et al. ........................ 382/154 |
| 2010/0238160 | A1* | 9/2010 | Yea et al. ....................... 345/419 |
| 2011/0026809 | A1  | 2/2011 | Jeong et al. |
| 2012/0176473 | A1* | 7/2012 | Genova et al. .................. 348/46 |
| 2012/0182299 | A1* | 7/2012 | Bowles et al. ................. 345/426 |

FOREIGN PATENT DOCUMENTS

| TW | 200710550 | 3/2007 |
| TW | 201023618 | 6/2010 |
| TW | 098129160 | 8/2010 |

OTHER PUBLICATIONS

Chen, et al., "Depth-Level-Adaptive View Synthesis for 3D Video", IEEE, 2010, pp. 1724-1729.

(Continued)

*Primary Examiner* — Carlos Perromat
*Assistant Examiner* — Xin Sheng
(74) *Attorney, Agent, or Firm* — Muncy, Geissler, Olds & Lowe, P.C.

(57) ABSTRACT

A view synthesis method of depth mismatching checking and depth error compensation, wherein, input left and right maps are warped in a processor to perform view synthesis, comprising following steps: when a present pixel moves to a position of a target pixel after warping, compute respectively pixel displacement amounts for said present pixel to move to said target pixel in said left and said right maps, to figure out coordinate of said target pixel; determine if depth value of the present pixel is greater than that of said target pixel, if an answer is positive, determine if depth value of said present pixel matches that of coordinate adjacent to said target pixel; and if answer is negative, set depth value of said target pixel to a hole; otherwise, cover said target pixel with pixel value of said present pixel, hereby completing refining even minute errors.

14 Claims, 7 Drawing Sheets
(2 of 7 Drawing Sheet(s) Filed in Color)

(56) References Cited

OTHER PUBLICATIONS

Shih, et al., "A Depth Refinement Algorithm for Multi-Ciew Video Synthesis", IEEE, 2010, pp. 742-745.
Yang, et al., "Error Supression in View Synthesis Using Reliability Reasoning for FTV", IEEE, 2010, 4 pages.
Feng, et al., "Asymmetric Bidirectional View Synthesis for Free Viewpoint and Three-dimensional Video", IEEE, Oct. 14, 2009, 7 pages.
Chen, et al., "Choose Your Own Viewpoint: A High-Quality/Low-Complexity Free-Viewpoint 3D Visual System", IEEE, 2009, pp. 9-12.

\* cited by examiner

Fig. 7A

# VIEW SYNTHESIS METHOD CAPABLE OF DEPTH MISMATCHING CHECKING AND DEPTH ERROR COMPENSATION

BACKGROUND OF THE INVENTION

1. Field of the Invention

The present invention relates to a view synthesis technology, and in particular to a view synthesis method capable of depth mismatching checking and depth error compensation.

2. Brief Discussion of the Related Art

The view synthesis technology is derived from a Depth-Image-Based-Rendering (DIBR) technology. In real life viewing, when a viewer facing objects in a scene, as he moves along a short distance, he may find the change of relative position between him and the object located at a large distance, is much small than the change of relative position between him and the object located at a small distance. The view synthesis makes use of this technology to simulate and obtain a middle frame. Since the relative movement of a foreground object is much more than that of a background object, based on this principle, if depth information is obtained, then it can be derived to know the amount of change of relative positions for an object on a left and right frames. And based on this change amount, each object having different depth value could have different warping result, so as to simulate and obtain a pseudo view frame, as shown in equation (1) below:

$$I(i,j)=(1-w)*I_L(i+w*d,j)+w*I_R(i-(1-w)*d,j) \qquad (1)$$

The equation (1) above indicates the operations of first performing warping computation respectively for the original left and right maps, then combine the results together to synthesize and obtain a pseudo view frame. In equation (1) above, (i, j) represents coordinate of an object on the map; w represents view weight parameter, with its value from 0 to 1, and when it is close to 1, that means the view is closer to the right real camera; $I_w$, $I_L$, $I_R$ represent respectively the pseudo frame, the left frame, and the right frame; $I_{w,R,L}$ (i, j) represents the pixel value of coordinate in the left and right maps; and d is the disparity value computed from the depth value, that means the difference of relative positions of the same object in the left and right frames.

Figure 1A:
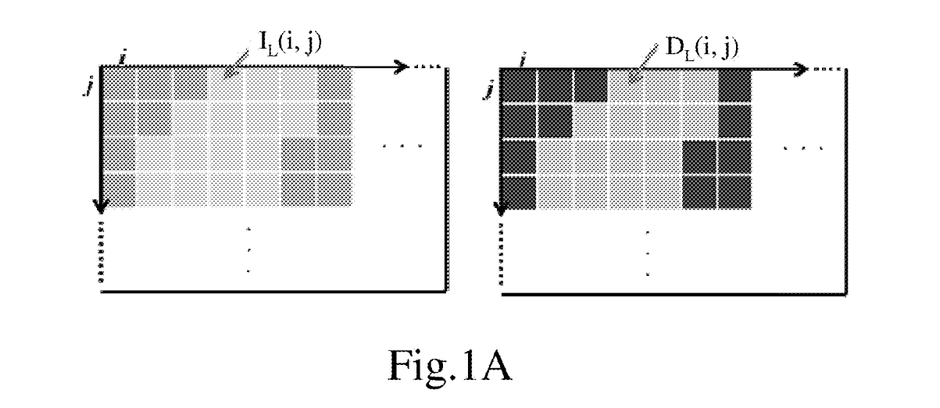
FIG. 1(A) includes schematic diagrams of an original view frame and its corresponding depth map according to the present invention.
Figure 1B:
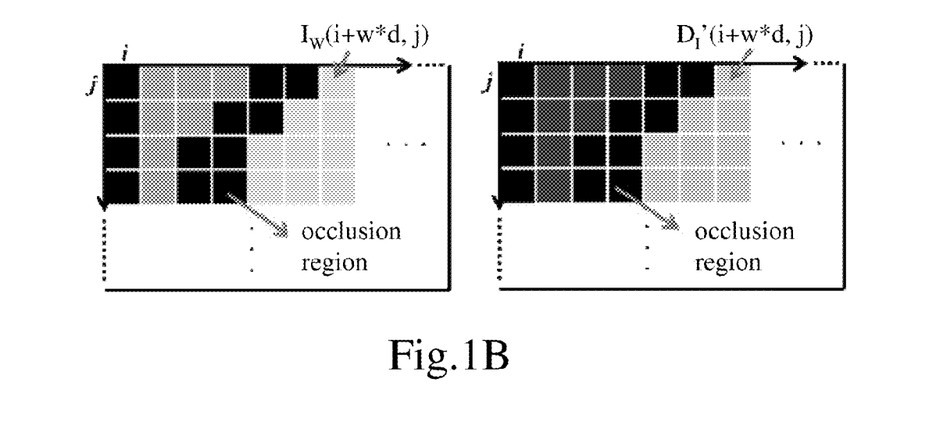
FIG. 1(B) includes schematic diagrams of a warped frame and its corresponding depth map according to the present invention.

In general, a complete view synthesis algorithm is composed of two parts of computation: warping computation, and Hole Filling. Wherein, the warping computation is used to change the relative positions of the objects on the frame based on disparity value and view weight parameter. The appearance of dark portion caused by warping computation indicates the portion originally blocked by the foreground, and is referred to as Occlusion Region or Holes. This Occlusion Region usually will disappear after warping and blending of the original left and right maps. The reason for this is that, most of the portions blocked by the foreground in the left map can be found in the right map, as shown in FIGS. 1(A) and 1(B). FIG. 1(A) shows the frame of the original view, and its related depth map; while FIG. 1(B) shows the frame after warping and its related depth map. In theory, after blending operation, no holes will appear any longer; however, in fact, in addition to being generated by the occlusion regions, a major reason for the appearance of holes is due to depth value error, or minute differences of depth values for different parts of an object. In this condition, the holes can not be filled out completely through blending, therefore, Hole Filling has to be performed to refine the pseudo frame to be close to a real image frame.

Presently, there are various ways of filling the holes, the basic approach is to fill the holes with pixel values of its adjacent background (minimum depth). By way of example, the major reasons of hole generation is that, after warping computation of frame, the disparities of foreground and background are different, thus leading to the result that the originally occluded portions are displayed, that is usually blocked from being displayed. That portion is the background portion, of which the depth value is relatively small, therefore, the pixels nearby the hole having small depth values are used to fill up the occlusion region. Finally, after filling up the holes, a middle pseudo frame will be generated.

Since the view synthesis technology is very sensitive to the quality of depth map, once an error occurs in the depth map, it will be transmitted to the pseudo frame, to make the frame deformed or unnatural. Therefore, the present invention proposes a view synthesis method capable of depth mismatching checking and depth error compensation, to overcome the afore-mentioned problems of the prior art.

Therefore, presently, the design and performance of the view synthesis technology is not quite satisfactory, and it has much room for improvements.

SUMMARY OF THE INVENTION

In view of the problems and shortcomings of the prior art, A major objective of the present invention is to provide a view synthesis method capable of depth mismatching checking and depth error compensation, that can solve the depth error problems that size of object in depth map is not equal to size of the real object, so that after synthesis and refinement, the crack of an object in a frame is filled with object in background, hereby eliminating redundant computations.

Another objective of the present invention is to provide a view synthesis method of depth mismatching checking and depth error compensation. Wherein, the warping computation flow is improved, so instead of preprocessing the depth map in advance before view synthesis, compensation warping computation is performed to raise quality of pseudo frame, to simplify computation complexity.

A yet another objective of the present invention is to provide a view synthesis method of depth mismatching checking and depth error compensation. Wherein, whether depths of the same object in a map is continuous is used to determine if it is required to compute displacement amount, to reduce computations of pixel displacement amount, and raise operation efficiency.

In order to achieve the above-mentioned objective, the present invention provide a view synthesis method of depth mismatching checking and depth error compensation. Wherein, the input left map and right map is warped in a processor to perform view synthesis. When a present pixel moves to position of a target pixel after warping, compute respectively the pixel displacement amount for the present pixel moved to the target pixel in the left map and the right map, to figure out the coordinates of the target pixel. Then, determine if the depth value of the present pixel is greater than that of the target pixel. In case the answer is positive, determine if the depth value of the present pixel matched to that of the coordinate adjacent to the target pixel; if the answer is negative, set the depth value of target pixel as a hole; otherwise, cover the target pixel with the pixel value of the present pixel. Finally, refine and finish the minute error portion.

The present invention further provides a method to determine equal depth blocks in view synthesis, comprising the following steps: obtain a depth map respectively for a left map and right map after warping; determine in the depth map, at least a depth continuous portion and at least depth non-continuous portion; and set a threshold value, when the depth variation is less than the threshold value, adopt the displacement amount of the previous pixel as the displacement amount of the present pixel; and when the depth variation is greater than the threshold value, compute respectively the pixel displacement amount for the present pixel to move to a target pixel in the left map and the right map.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The related drawings in connection with the detailed description of the present invention to be made later are described briefly as follows, in which:

FIGS. 6(A) and 6 (B) are results of comparisons of intuition method of the prior art and method of the present invention; and FIGS. 7(A) and 7 (B) are schematic diagrams of an original approach of the prior art, and an embodiment of the method of the present invention using warping operation according to the present invention.

DETAILED DESCRIPTION OF THE PREFERRED EMBODIMENT

The purpose, construction, features, functions and advantages of the present invention can be appreciated and understood more thoroughly through the following detailed description with reference to the attached drawings. And, in the following, various embodiments are described in explaining the technical characteristics of the present invention.

The present invention provides a view synthesis method of depth mismatching checking and depth error compensation, that is used in image processing of multi-view display. In the present invention, low complexity computation algorithm is used in a processor to determine erroneous depth regions. Based on depth edge judgment and comparison of the rounded disparity, to perform compensation warping operation and object residual edge refinement, in raising authenticity of pseudo frame. Moreover, depth continuity is determined to reduce computational complexity.

Figure 2A:
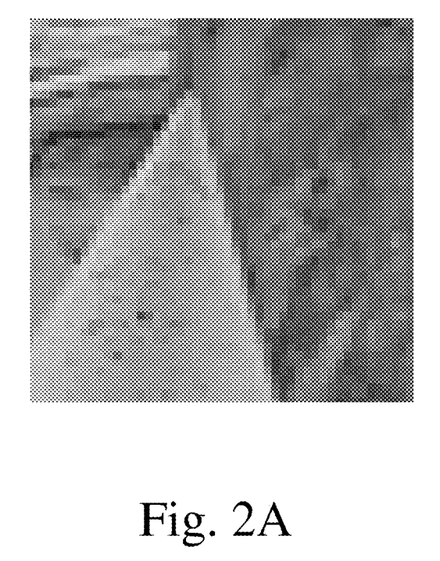
FIGS. 2(A) and 2(B) are schematic diagrams of the original image and image having errors after warping according to the present invention.
Figure 2B:
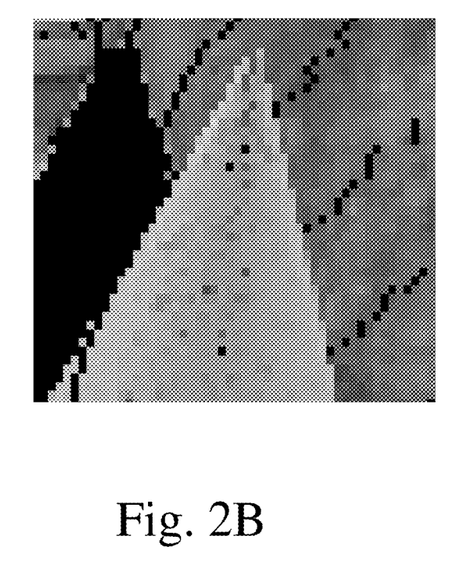

For the depth maps generated through using different algorithms, size mismatching could occur for the object in depth edge, and the object in real color map. In case the size of object in the depth map is larger than that of the real object, then after view synthesis, the background in the surrounding of the object seems to be connected with the object, such that for different views, background in the surrounding of the object and the object itself do not have difference in disparity, thus the foreground and background lose their fore- and back-relations, such that in moving views, the object will move together with a large block of background. Or, alternatively, in case size of object in the depth map is smaller than the real object, then it could cause the edge of the object remaining on the background, so that marked object contour line will appear in the background. In addition, for different parts on the same object, depth values may have slight differences, so that after warping operation, cracks may develop on the object, and that are filled with background pixels, as shown in FIGS. 2(A) and 2(B). Wherein, FIG. 2(A) shows the original image, while FIG. 2(B) shows image of an error condition. In order to solve this problem, the present invention proposes a method to eliminate the two erroneous conditions, as explained in detail as follows.

Figure 3:
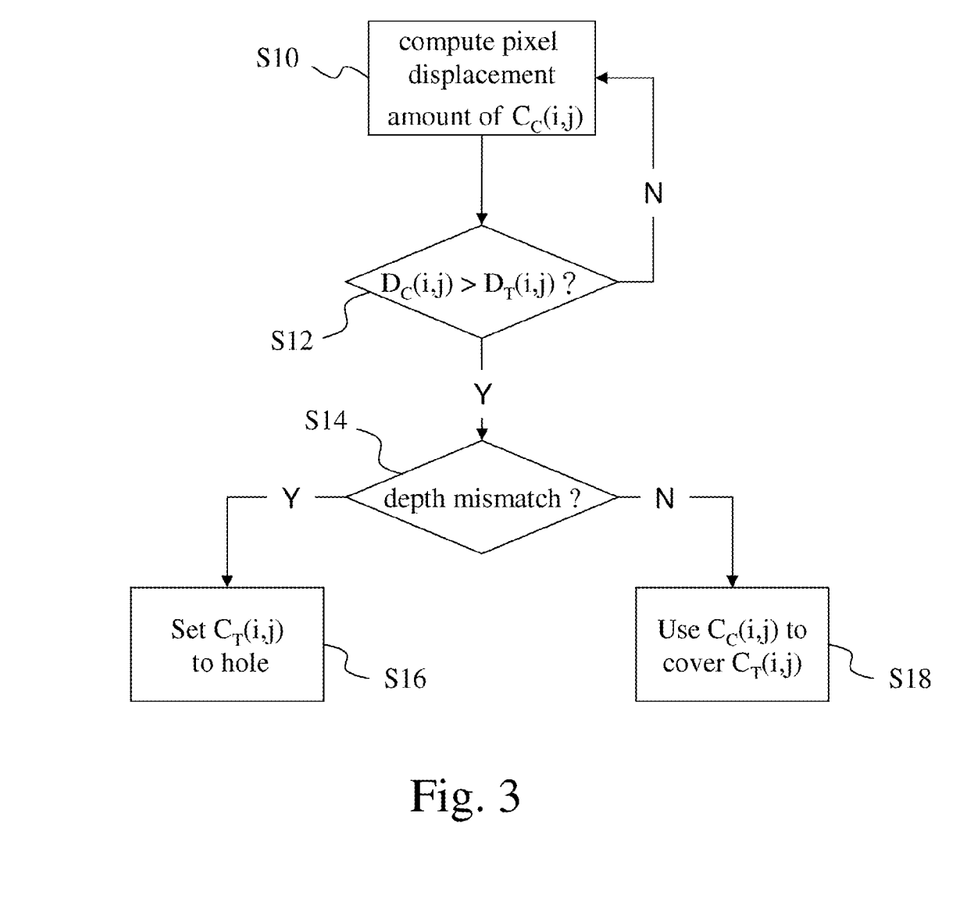
FIG. 3 is a flowchart of the steps of a view synthesis method according to the present invention.

FIG. 3 is a flowchart of the steps of a view synthesis method according to the present invention. Wherein, assume that $D_C(i, j)$, $C_C(i, j)$ represent respectively the depth value and pixel value of the present pixel to be performed warping operation, and after warping, the present pixel will move to a new position, occupied currently by the target pixel. $D_T(i, j)$, $C_T(i, j)$ represent respectively the depth value and pixel value of the target pixel. As shown in FIG. 3, firstly, in step S10, compute to obtain a pixel displacement amount, as shown in the equations (2) and (3) below. Wherein, dl represents the integral displacement amount for a certain pixel in the left map, dr represents the integral displacement amount for a certain pixel in the right map. $V_D$ is depth value. $f_s$ is a scale factor, used to transform depth value and displacement amount (or referred to as disparity value), that is usually related to the matching range while performing disparity estimation operation. In general, the larger the distance between lenses of the left and right cameras, the larger the matching range, and the smaller the Scale Factor. By way of example, when the distance between lenses of the left and right cameras is about 5 to 20 cm, the scale Factor is about between 4 and 1. Equation (2) is used to compute displacement amount dl in the left map, and Equation (3) is used to compute displacement amount dr in the right map. W indicates the parameter of a view selected by a user or viewer, with its value between 1 and 0, the closer the value gets to 1 means the closer it gets to the right view frame, while the closer the value gets to 0 means the closer it gets to the left view frame.

$$dl = \text{round}\left(\frac{V_D}{f_s} \times w\right) \quad (2)$$

$$dr = \text{round}\left(\frac{V_D}{f_s} \times (1-w)\right) \quad (3)$$

Refer again to FIG. 3), firstly, in step S10 compute a pixel displacement amount. Next, in step S12, determine whether the depth value of the present pixel is greater than the depth value of the pixel (referred to as the target pixel) of horizontal coordinate of the present pixel plus the displacement amount.

In case the former is not greater than the latter, that means that after warping, the pixel is occluded, then return to step S10 to proceed with computation of the next pixel. Otherwise, that means that after warping, the pixel belongs to a foreground object, so the pixel needs to be displayed. Then, in step S14, determine whether depth value of the present pixel matches that of the adjacent coordinate of the target pixel. The adjacent coordinate is a coordinate unit to the right of the target pixel, or a coordinate unit to the left of the target pixel. Therefore, in step S14, determine whether the depth value of the target pixel is less than the depth value of the adjacent coordinate. If the answer is positive, that means the depths are not matched, then in step S16, set the depth value of the target pixel as a hole. Otherwise, it means that the depths match, then in step S18, cover the target pixel with pixel value of the present pixel.

Figure 4:
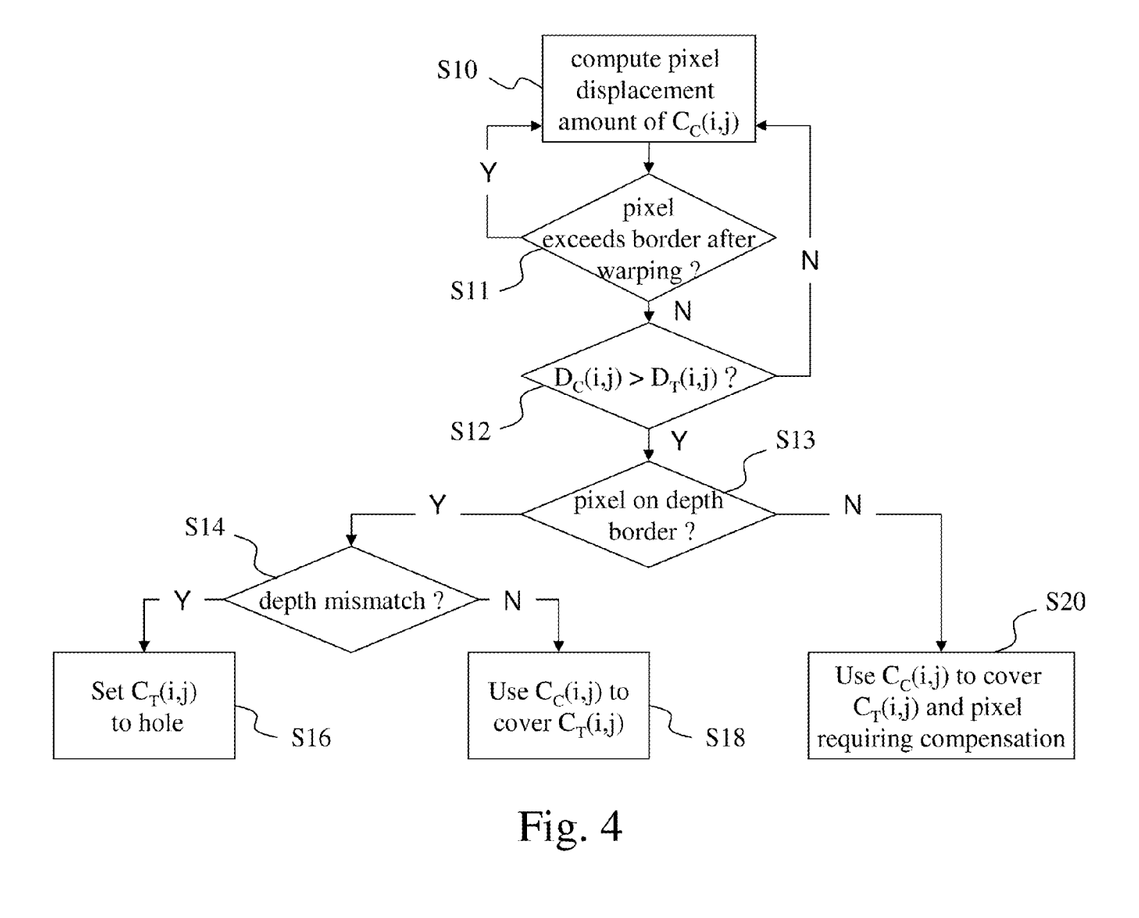
FIG. 4 is a flowchart of the detailed steps of a view synthesis method according to the present invention.

In the descriptions mentioned above, in order to determine more precisely the coordinate and pixel value of the target pixel, the present invention further provides more detailed determination steps in FIG. 4 to supplement steps in FIG. 3. Refer to FIG. 4 for a flowchart of the detailed steps of a view synthesis method according to the present invention. As shown in FIG. 4, firstly, in step S10 compute a pixel displacement amount. Next, in step S11, determine whether the coordinate of the present pixel (coordinate in the horizontal direction) plus this amount will exceeds the maximum border of the map or image. In case the answer is positive, then return to step S10 to proceed with operation for the next pixel; otherwise perform step S12 as mentioned above.

If in step S12 it is determined that the depth value of the present pixel is greater than that of the target pixel, then continue to perform step S13, to determine if the target pixel is located at depth border. The reasons for doing this is to first set the places liable to have depth errors to holes, to facilitate subsequent Hole Fillings to refine the region, so depth border determination is added herein. Herein, size of object in depth map less than the real object is taken as an example for explanation. Usually, depth map errors tend to occur at border of foreground object and background object, and depth value at location of error will become depth value of background, and once that happens, it would be rather difficult to refine it with Hole Filling in the subsequent processing. For this reason, the present invention proposes a method to fill this depth map errors with correct information before performing warping operations. Since depth errors tend to appear at edges of an object, therefore, it is essential to determine if the target pixel is at border of depth. In case the answer is positive, that means depth errors are likely to occur. Then, in step S14, add the error determination to raise its accuracy, to avoid treating all the edges as error regions.

When the present pixel is at depth border, determine further if depth value of the present pixel is less than depth value of the pixel one coordinate unit to the right of the present pixel, or if depth value of the present pixel is less than depth value of the pixel one coordinate unit to the left of the present pixel (the number of coordinate units can be adjusted according to error characteristics of the depth map). As shown in step S14, in case the above conditions stand, then it means that the pixel is likely in the error region, so in step S16, set the pixel value of the pixel at the position after displacement as a hole; otherwise, that means the pixel is not in the error region. Since the pixel is located in the edge region, so in step S18 fill the present pixel into this region, without performing compensational warping operations.

Figure 5:
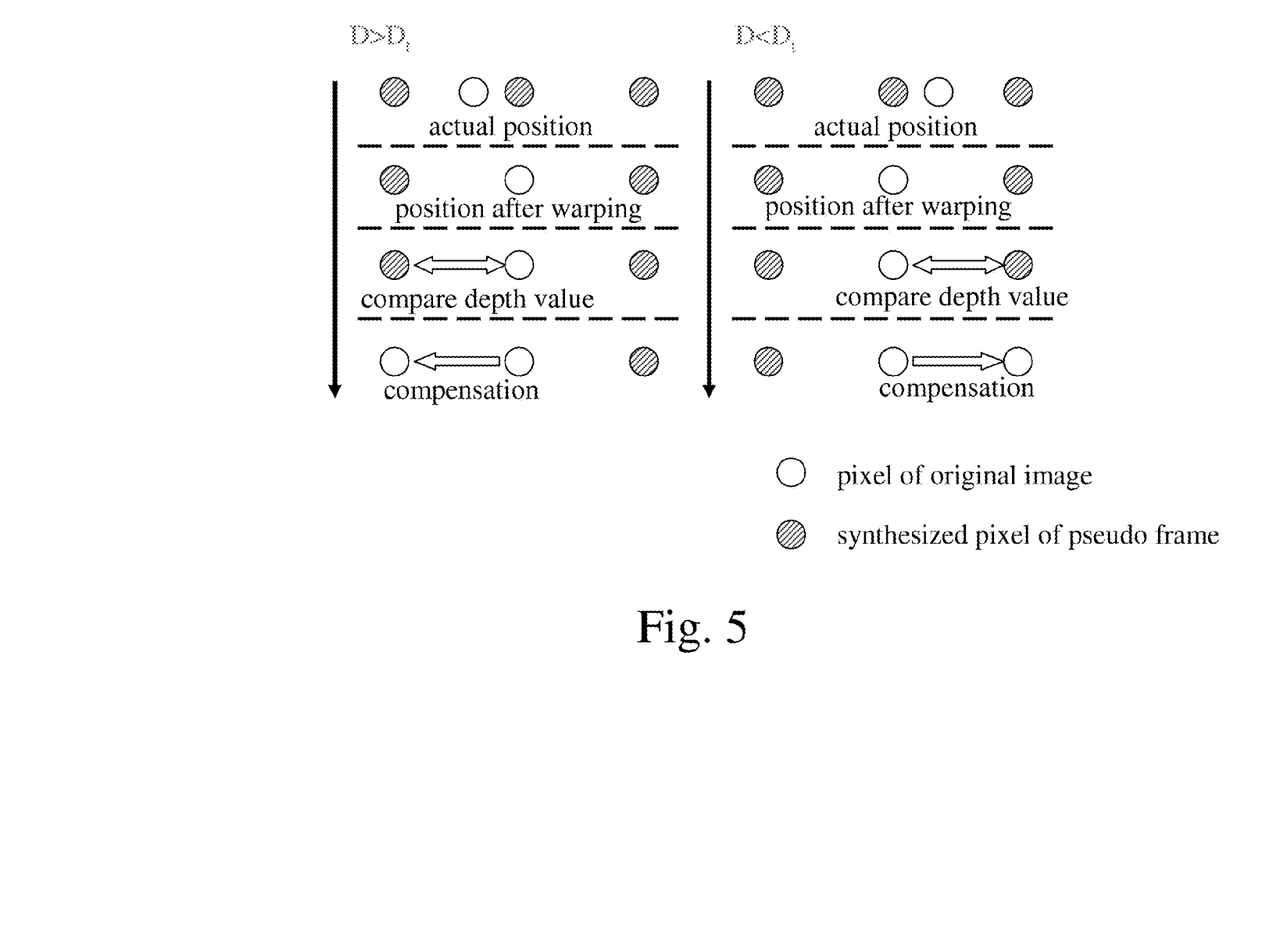
FIG. 5 is a schematic diagram of compensation warping computation according to the present invention.

On the contrary, in case in step S13 it is determined that the present pixel is not at the edge region, that means after warping the present pixel is in the object, so in order to eliminate the errors of object's crack, the present invention provides compensational warping operation, as shown in FIG. 5. Wherein, D indicates the displacement amount (non-integer-number displacement amount) before rounding, and $D_t$ indicates the displacement amount (integer-number displacement amount) after rounding. In this method, before performing compensational warping operation, fill the pixel value and depth value of the present pixel into the target pixel. Then, compute the non-integer number displacement amount (dlf), as shown in the following equation (4). The non-integer-number displacement amount is used to compare with the integer-number displacement amount, to determine the present pixel is to the left or to the right of the target pixel.

$$dlf = \frac{V_D}{f_s} \times w \qquad (4)$$

In case $D<D_t$, namely the integer-number displacement amount is greater than the non-integer-number displacement amount, that means after warping, the present pixel could affect both the target pixel and the pixel to its left. Then, determine further if depth value of the pixel to the left of the target pixel is less than the depth value of the present pixel, and if the answer is positive, then fill the present pixel into pixel to the left of target pixel. In contrast, in case $D>D_t$, namely the integer-number displacement amount is less than the non-integer-number displacement amount, that means after warping, the present pixel could affect both the target pixel and the pixel to its right. Then, determine further if depth value of the pixel to the right of the target pixel is less than the depth value of the present pixel, and if the answer is positive, then fill the present pixel into pixel to the right of target pixel, as shown in FIG. 5.

Figure 6A:
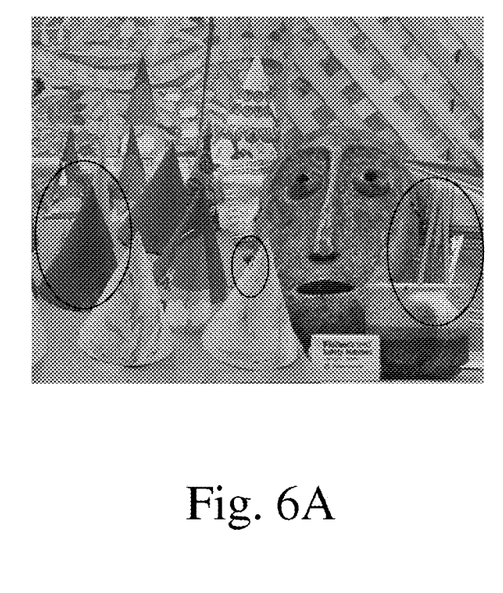
Figure 6B:
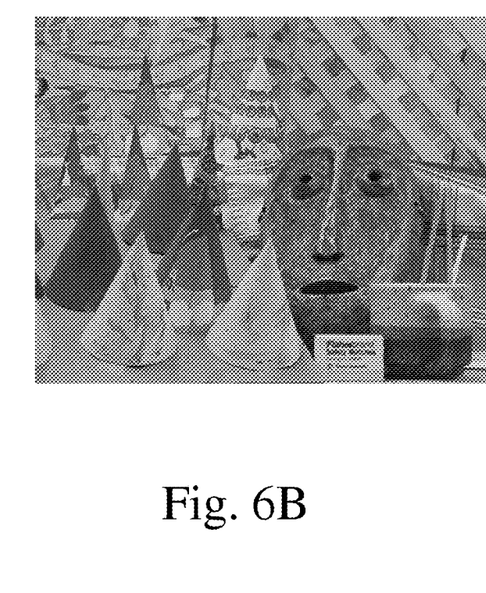

Subsequently, perform blending operation for the left and right maps after warping, to refine most of the occlusion regions. Finally, refine minute errors with background depth values through Hole Filling. FIGS. 6(A) and 6 (B) are results of comparisons of intuition method of the prior art and method of the present invention. From FIG. 6(B) it is evident that, after the improvement of the present invention, the cracks at the border and inside the object have disappeared. For more slender objects, the errors after computation are reduced significantly.

In addition to improving quality of pseudo display image, the present invention further provides a method to determine blocks of equal depth, to reduce redundant computation steps in view synthesis. Since in performing warping for the same object, it happens quite often that, it will compute repeatedly to obtain the same displacement amount, due to the same depth value in different parts of the same object without too much variations. Therefore, the present invention utilizes this characteristic, to first determine the depth continuous portions and depth non-continuous portions in the depth map, and set a threshold value. Only when depth variation exceeds this threshold value, will it re-compute the pixel displacement amount from the present pixel to the target pixel in the left and right maps. The threshold value is from 0 to 255, the lower the threshold value, the more computations are required, the greater the threshold value, the less computations are required, yet the quality of frame is reduced also. When the threshold value is zero, its effect is equivalent to not using this method. In addition, when the threshold value is set to 1, the computation amount can be reduced by about 90%. Therefore, in considering computation amount and quality of frame, the best embodiment is to set the threshold value to 1.

Figure 7A:
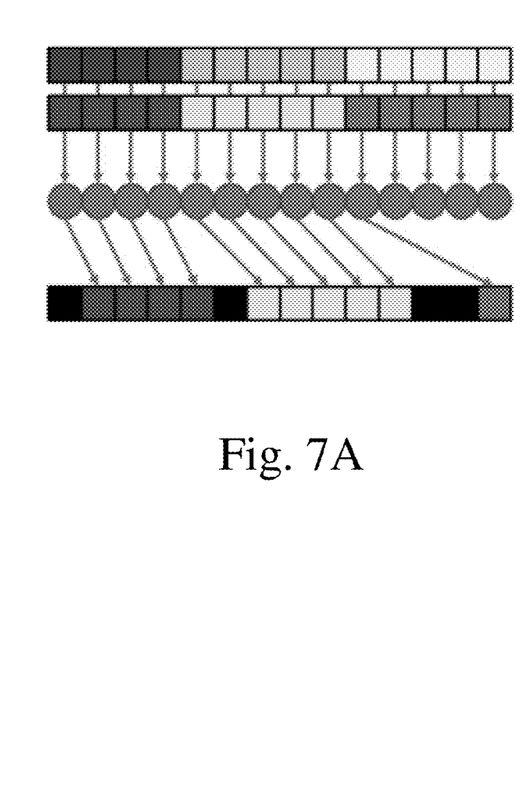
Figure 7B:
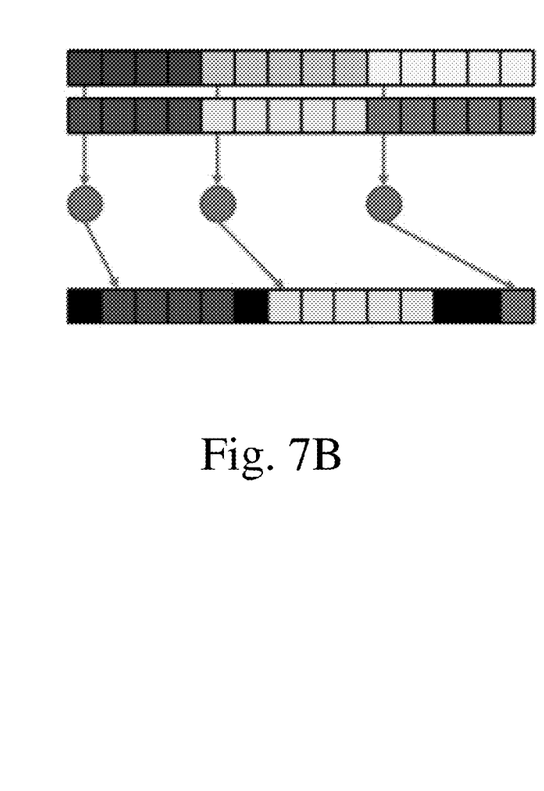

In the condition of no large variations of depth value (change of depth value is less than the threshold value), before performing warping operation, utilize the previous pixel displacement amount obtained for the present pixel through warping, as the displacement amount for the present pixel. As shown in FIGS. 7A and 7B, the color portions represent the colors on the original map, the black and white portions represent the corresponding depth value, and blue color circle represents the operators used in computing the displacement amount. FIG. 7A shows that for the conventional method, it requires 10 warping operations. In the present invention, warping operation is performed only when depth value is changed, so only three warping operations are required, as shown in FIG. 7B.

Summing up the above, the present invention provides a view synthesis method. Wherein, through determining edge depth value, and depth value matching, to determine if the differences between the present pixel and the target pixel after warping need compensation. In addition, compensation warping operation is used to refine residual object edge, raise quality of pseudo frame, and simplify computational complexity. Moreover, in the present invention, in an image frame, the requirement of computing displacement amount is based on whether depth values in different parts of an object are continuous, so as to reduce the computations for the pixel displacement amount, and to raise computation efficiency.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A view synthesis method capable of depth mismatching checking and depth error compensation, wherein, inputting a left map and a right map are warped in a processor to perform view synthesis, comprising following steps:
   (a) when a present pixel moves to a position of a target pixel after warping, compute respectively pixel displacement amounts for said present pixel moving to said target pixel in said left map and said right map, to figure out coordinate of said target pixel;
   (b) determine if depth value of said present pixel is greater than that of said target pixel, in case answer is negative, return to step (a) to compute pixel displacement amount for next said present pixel;
   (c) determine if depth value of said present pixel matches that of coordinate adjacent to said target pixel; and
   (d) in case said answer is negative for step (b), set depth value of said target pixel as a hole; otherwise, cover said target pixel with pixel value of said present pixel.

2. The view synthesis method capable of depth mismatching checking and depth error compensation as claimed in claim 1, wherein coordinate of said target pixel is equal to horizontal direction coordinate value of said present pixel plus said pixel displacement amount.

3. The view synthesis method capable of depth mismatching checking and depth error compensation as claimed in claim 1, wherein said step (b) further includes a step of determining if said target pixel exceeds border, if answer is positive, return to said step (a) to compute pixel displacement amount of next said present pixel.

4. The view synthesis method capable of depth mismatching checking and depth error compensation as claimed in claim 1, wherein after said step (b), it further includes steps of:
   determine if said target pixel is on a depth value border; and
   if answer is positive, perform said step (c) to determine if said depth values are matched, in case answer is negative, then in addition to covering a pixel value of said present pixel on said target pixel, perform compensational warping operations.

5. The view synthesis method capable of depth mismatching checking and depth error compensation as claimed in claim 4, wherein said compensation warping operation is to fill said pixel value and a depth value of said present pixel into said target pixel, then compute an integer-number displacement amount and a non-integer-number displacement amount.

6. The view synthesis method capable of depth mismatching checking and depth error compensation as claimed in claim 5, wherein said non-integer-number displacement amount is obtained through dividing depth value of said present pixel by a scale factor, then multiplying it by a view parameter, said scale factor is used to transform said depth value, said integer-number displacement amount and said non-integer-number displacement amount, said view parameter is a parameter of angle viewed by a user.

7. The view synthesis method capable of depth mismatching checking and depth error compensation as claimed in claim 5, wherein in case said non-integer-number displacement amount is less than said integer-number displacement amount, said target pixel is located to left of said present pixel, then determine if said depth value of pixel left to said target pixel is less than depth value of said present pixel, if answer is positive, fill said present pixel into said pixel left to said target pixel.

8. The view synthesis method capable of depth mismatching checking and depth error compensation as claimed in claim 5, wherein in case said non-integer-number displacement amount is greater than said integer-number displacement amount, and said target pixel is located to right of said present pixel, then determine if depth value of pixel right to said target pixel is less than depth value of said present pixel, if answer is positive, fill said present pixel into said pixel right to said target pixel.

9. The view synthesis method capable of depth mismatching checking and depth error compensation as claimed in claim 4, further comprising:
   a step (e), perform blending operation for said left and right maps after warping operation, refine region where depth value of said present pixel is less than said depth value of said target pixel, and through Hole Filling, fill said pixel value of said present pixel before warping into a plurality of pixel coordinates having minute errors.

10. The view synthesis method capable of depth mismatching checking and depth error compensation as claimed in claim 1, further comprising:
    in a depth map of said left map or right map, determine at least a depth continuous portion and at least a depth non-continuous portion, and only when depth variation is large, perform said step (a) to compute said pixel displacement amount.

11. A Hole Filling method of a view synthesis method as claimed in claim 1, which performs blending operation for said left and right maps after warping operation, to refine region in said left map occluded by foreground, comprising following steps:
    refine regions where depth value of a present pixel is less than depth value of a target pixel; and through Hole Filling, fill said pixel value of said present pixel before warping into a plurality of pixel coordinates having minute errors.

12. The view synthesis method capable of depth mismatching checking and depth error compensation as claimed in claim 1, wherein said step (a) further includes steps of:
   obtain a depth map of said left map and said right map after warping;
   determine at least a depth continuous portion and at least a depth non-continuous portion in said depth map; and
   set a threshold value, when depth variation amount is less than said threshold value, adopt displacement amount of a previous pixel as displacement amount of said present pixel, and when depth variation amount is greater than said threshold value, compute respectively said pixel displacement amount for said present pixel to move to said target pixel in said left map and said right map.

13. The view synthesis method capable of depth mismatching checking and depth error compensation as claimed in claim 12, wherein said target pixel is at a position where said present pixel will move to after warping.

14. The view synthesis method capable of depth mismatching checking and depth error compensation as claimed in claim 12, wherein said previous pixel is a pixel that has finished warping operation before said present pixel performs warping operation.

* * * * *